(12) United States Patent
Wang et al.

(10) Patent No.: US 8,625,390 B2
(45) Date of Patent: Jan. 7, 2014

(54) ACOUSTIC WAVEFORM STACKING USING AZIMUTHAL AND/OR STANDOFF BINNING

(75) Inventors: Tsili Wang, Katy, TX (US); Paul Boonen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 612 days.

(21) Appl. No.: 12/858,626

(22) Filed: Aug. 18, 2010

(65) Prior Publication Data

US 2012/0044783 A1    Feb. 23, 2012

(51) Int. Cl.
*G01V 1/40* (2006.01)

(52) U.S. Cl.
USPC .............................................. 367/34; 367/35

(58) Field of Classification Search
CPC ............. G01V 1/40; G01V 1/48; G01V 1/52; G01V 1/44
USPC ...................................... 367/34, 35
See application file for complete search history.

(56) References Cited

U.S. PATENT DOCUMENTS

| | | | |
|---|---|---|---|
| 4,210,967 A | 7/1980 | Ingram | |
| 4,594,691 A | 6/1986 | Kimball et al. | |
| 4,698,792 A | 10/1987 | Kurkjian et al. | |
| 4,774,693 A | 9/1988 | Winbow et al. | |
| 4,779,236 A | 10/1988 | Sondergeld | |
| 4,922,362 A | 5/1990 | Miller et al. | |
| 5,278,805 A | 1/1994 | Kimball | |
| 5,639,997 A | 6/1997 | Mallett | |
| 5,726,951 A * | 3/1998 | Birchak et al. | ................... 367/38 |
| 5,780,784 A | 7/1998 | Robbins | |
| 5,852,262 A | 12/1998 | Gill et al. | |
| 5,859,811 A * | 1/1999 | Miller et al. | ................... 367/35 |
| 5,886,303 A | 3/1999 | Rodney | |
| 5,936,913 A | 8/1999 | Gill et al. | |
| 6,470,275 B1 | 10/2002 | Dubinsky | |
| 6,614,360 B1 | 9/2003 | Leggett, III et al. | |
| 6,631,327 B2 | 10/2003 | Hsu et al. | |
| 6,661,737 B2 | 12/2003 | Wisnieswski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |
| 6,791,899 B2 | 9/2004 | Blanch et al. | |
| 6,957,145 B2 | 10/2005 | Spross | |

(Continued)

FOREIGN PATENT DOCUMENTS

WO    WO20120241210    *  2/2012    ................ G01V 1/40

OTHER PUBLICATIONS

International Search Report and Written Opinion of the International Searching Authority of PCT International Patent Application No. PCT/US2011/047191 dated Feb. 29, 2012.

(Continued)

*Primary Examiner* — Daniel Pihulic
(74) *Attorney, Agent, or Firm* — Kenneth Liu; Jeremy Berman

(57) ABSTRACT

A method for making acoustic logging measurements includes grouping received acoustic waveforms into one of a plurality of groups, each group being representative of a measured borehole condition (e.g., a range of measured standoff values and/or a range of measured azimuth angles). The waveforms stored in at least one of the groups are stacked so as to obtain an averaged waveform. The averaged waveform may be further processed, for example, via a semblance algorithm to obtain at least one acoustic wave slowness.

15 Claims, 2 Drawing Sheets

(56) References Cited

U.S. PATENT DOCUMENTS

| | | | |
|---|---|---|---|
| 7,035,924 | B2 | 4/2006 | DeLuca et al. |
| 7,103,982 | B2 * | 9/2006 | Haugland ............ 73/152.01 |
| 7,518,949 | B2 | 4/2009 | Haugland |
| 2006/0096105 | A1 * | 5/2006 | Haugland ............ 73/152.01 |
| 2010/0076688 | A1 * | 3/2010 | Moake ..................... 702/8 |
| 2012/0044783 | A1 * | 2/2012 | Wang et al. ............ 367/35 |

OTHER PUBLICATIONS

X. M. Tang, et al., "Shear-Velocity Measurements in the Logging-While Drilling Environment: Modeling and Field Evaluations," Petrophysics, vol. 44, No. 2 (Mar.-Apr. 2003), pp. 79-90.

X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6, Jun. 1979; pp. 1041-1063.

C. H. Cheng and M. Nfi Toksoz, "Determination of Shear Wave Velocities in "Slow" Formations," SPWLA 24th Annual Logging Symposium, Jun. 37-30, 1983, Paper V.

Georgios L. Varsamis, et al., "A New MWD Full Wave Dual Mode Sonic Tool Design and Case Histories," SPWLA 40th Annual Logging Symposium, May 30-Jun. 3, 1999, Paper P.

F. El-Wazeer, et al., "Applications for a Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

Boonen, P., Yogeswaren, E., "A dual-frequency LWD sonic tool expands existing unipolar transmitter technology to supply shear wave data in soft formations" SPWLA 45th Annual Logging Symposium, Jun. 6-9, 2004.

Market, J. and Deady, R., "Azimuthal Sonic Measurements: New methods in theory and practice" SPWLA 49th Annual Logging Symposium, May 25-28, 2008.

Market, J., "New Broad Frequency LWD Multipole Tool Provides High Quality Compressional and Shear Data in a Wide Variety of Formations" SPWLA 48th Annual Logging Symposium, Jun. 3-6, 2007.

Kozak, M., "Phase Velocity Processing for Acoustic Logging-While-Drilling Full Waveform Data" SPWLA 42nd Annual Logging Symposium, Jun. 17-20, 2001.

* cited by examiner

ACOUSTIC WAVEFORM STACKING USING AZIMUTHAL AND/OR STANDOFF BINNING

RELATED APPLICATIONS

None.

FIELD OF THE INVENTION

The present invention relates generally to acoustic logging while drilling of subterranean formations. More particularly, this invention relates to a method for waveform stacking using azimuthal and/or standoff binning.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a formation. In one application, acoustic pulses may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slowness) of a formation.

In the analysis of acoustic logging measurements, the received acoustic waveforms are typically coherence processed to obtain a time-slowness plot. In a time-slowness plot, also referred to as a slowness-time-coherence (STC) plot or a semblance plot, a set of several signals from the array of acoustic receivers is processed with the incorporation of separate time shifts for each received signal. The separate time shifts are based on a slowness value assumed for the purpose of processing the waveforms. The processing provides a result, known as coherence, which can signify the presence of a discernable signal received by the separate receivers. In this manner compressional and shear wave arrivals can be discerned in the received waveforms, leading to determinations of their velocities. The determined compressional and shear wave velocities are related to compressive and shear strengths of the surrounding formation, and thus provide useful information about the formation.

Like any other downhole measurement, acoustic logging data are subject to various sources of noise both internal and external to an acoustic logging tool. Internal noises may include instrument noises and interference of nearby downhole tools. External noises may include drilling noises, mud flow noises, noises from non-steady tool positions or varying mud properties, and local variations in near borehole rock properties. These noise sources are commonly at least somewhat random in nature and can significantly erode the signal to noise ratio of a detected acoustic signal.

Therefore, there exists a need for an improved method for making acoustic logging while drilling measurements in a subterranean formation. In particular, there is a need for an improved method for making acoustic logging while drilling measurements that can achieve improved signal to noise ratios during logging while drilling operations.

SUMMARY OF THE INVENTION

The present invention addresses one or more of the above-described drawbacks in currently available and practiced methods for making acoustic logging while drilling measurements in a subterranean formation. Aspects of the present invention include grouping received acoustic waveforms into one of a plurality of groups, each group being representative of a measured borehole condition such as a range of measured standoff values and/or a range of measured azimuth angles. The groups are preferably non-overlapping. The waveforms stored in at least one of the groups are stacked so as to obtain an averaged waveform. The averaged waveform may be further processed, for example, via a semblance algorithm to obtain one or more of a compressional wave slowness, a shear wave slowness, or a borehole guided wave slowness.

Exemplary embodiments of the present invention provide several technical advantages. For example, averaging waveforms that have been sorted into groups with similar standoff distances and/or azimuth angles tends to significantly reduce random noise. Such noise reduction tends to further improve the accuracy of the calculated acoustic wave slowness. Waveform stacking may further provide information from which a quality indicator may be derived for the calculated slownesses. For example, a small variation between grouped waveforms would tend to indicate that the computed slownesses are more reliable. Such a quality indicator may be further used, for example, in weighting the computed slownesses for petrophysical or other uses.

In one aspect the present invention includes a method for making acoustic logging while drilling measurements in a subterranean formation. The method includes rotating an acoustic logging while drilling tool in a borehole, the borehole having a borehole wall. The tool includes at least one acoustic transmitter configured to transmit an acoustic pulse into the borehole, at least one linear array of longitudinally spaced acoustic receivers, and at least one sensor configured to measure a borehole condition. The transmitter transmits a plurality of sequential pulses of acoustic energy into the subterranean formation and the receivers receive corresponding acoustic waveforms. The sensor measures borehole conditions corresponding to at least one of the transmitting or receiving. The waveforms are sorted into a plurality of groups, each group representative of a range of values of the borehole condition. The waveforms from at least one of the groups are stacked to acquire average waveforms. In one exemplary embodiment of the invention an acoustic wave slowness is computed using a semblance algorithm and the average waveforms. In preferred embodiments of the invention the borehole condition includes at least one of a standoff distance and an azimuth angle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
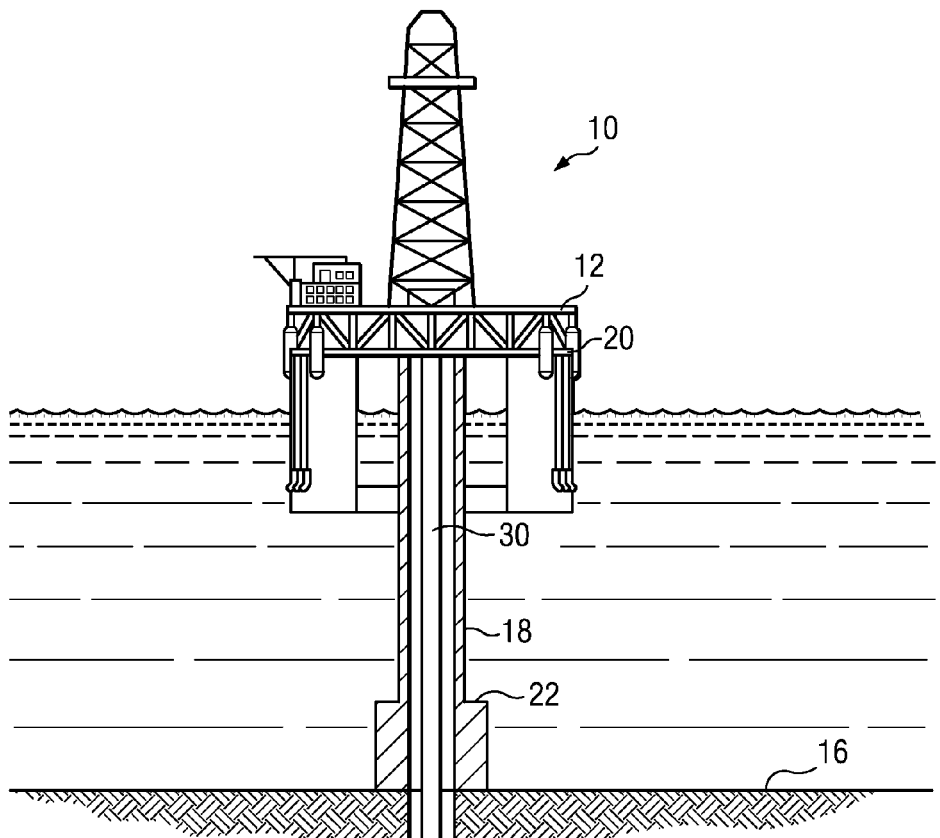
FIG. 1 is a schematic representation of an offshore oil or gas drilling platform utilizing an exemplary embodiment of the present invention.

FIG. 1 depicts an acoustic logging tool 42 deployed in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and an acoustic logging tool 42. As is known to those or ordinary skill in the art, drill string 30 may further include a downhole drill motor, a mud pulse telemetry system, a steering tool, and one or more other sensors, such as a nuclear logging sensors or resistivity sensors suitable for sensing downhole characteristics of the borehole and the surrounding formation. The invention is not limited in these regards.

It will be understood by those of ordinary skill in the art that the method embodiments of the present invention are not limited to use with a semisubmersible platform 12 as illustrated in FIG. 1. Method embodiments of the present invention are equally well suited for use in any kind of subterranean drilling operation, either offshore or onshore. Before describing method embodiments of the invention in more detail below, features of one exemplary embodiment of an acoustic logging tool 42 that may be used in connection with the invention are discussed.

Figure 2:
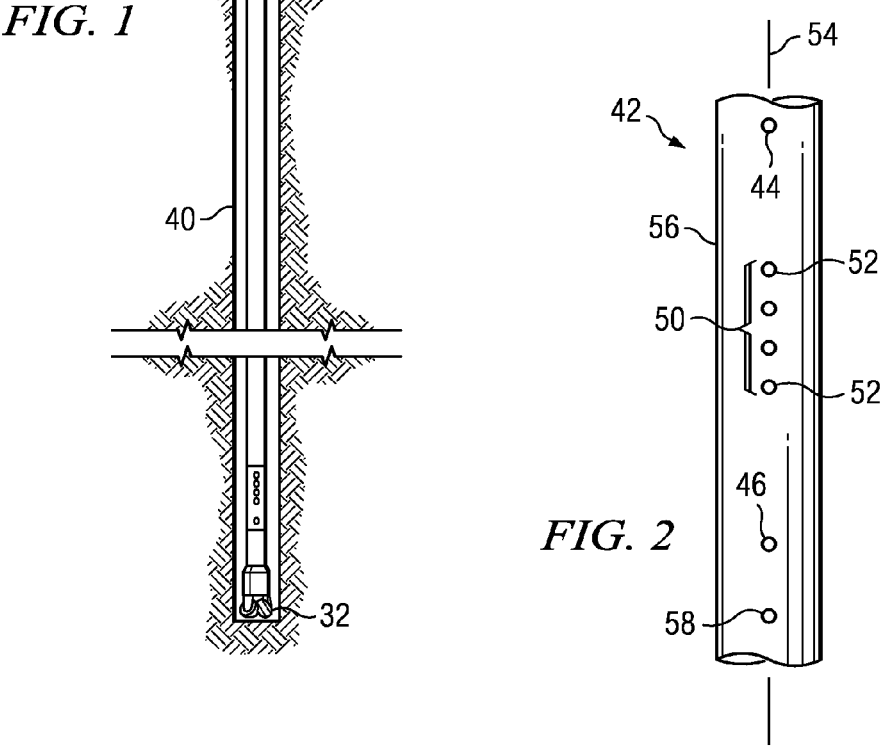
FIG. 2 depicts in a perspective view an acoustic logging while drilling tool useful in conjunction with exemplary methods of the present invention.

FIG. 2 depicts a perspective view of acoustic logging while drilling tool 42. Logging tool 42 is similar to that disclosed in commonly assigned U.S. Pat. No. 7,039,524 to Haugland and is typically a substantially cylindrical tool, being largely symmetrical about a cylindrical axis 54 (also referred to herein as a longitudinal axis). Acoustic logging tool 42 includes a substantially cylindrical tool body 56 configured for coupling to a drill string (e.g., drill string 30 in FIG. 1) and therefore typically, but not necessarily, includes threaded end portions (not shown). In the exemplary embodiment depicted, acoustic logging tool 42 includes at least one, and preferably two (as shown), acoustic transmitters 44 and 46 and a linear array 50 of longitudinally spaced receivers 52 deployed on the tool body 56.

Acoustic logging tool 42 may optionally further include one or more standoff sensors 58 for measuring, for example, the standoff distance between the transmitters 44 and 46 and receivers 52 and a borehole wall. Three or more circumferentially spaced standoff sensors may also be utilized, for measuring borehole caliper and the relative position of the tool 42 in the borehole. Such configurations are well known in the art (e.g., see commonly assigned U.S. Pat. No. 7,260,477 to Haugland). The tool 42 may further optionally include an azimuth sensor (not shown) configured to measure an azimuth angle of the transmitters 44 and 46 and receivers 52 as the tool 42 rotates in a borehole. Those of ordinary skill in the art will ready recognize that the standoff sensors and/or the azimuth sensor may be located elsewhere in the drill string. The invention is not limited in this regard.

Those of ordinary skill in the art will readily understand that the terms "azimuth" and "toolface" as used herein refer to an angular measurement about the circumference of the tool 42. In particular, these terms refer to the angular separation from a point of interest (e.g., an LWD sensor) to a reference point (e.g., the high side of the borehole). Azimuth measurements are conventional in the art and are commonly made with conventional survey sensors including accelerometers and/or magnetometers.

During an acoustic logging operation, one or both of the transmitters 44 and 46 transmits acoustic energy into the borehole. A portion of the transmitted energy enters the formation and induces compressional and/or shear waves therein. These compressional and shear waves tend to propagate through the formation and are then typically received by one or more of the receivers 52. As is known to those of ordinary skill in the art, the received compressional and shear waves may be utilized to determine compressional and shear wave velocities or slownesses of the formation (e.g., including conventional time-of-flight calculations). The compressional and shear wave velocities are related to compressive and shear strengths of the surrounding formation, and thus provide useful information about the formation.

It will be understood by those of ordinary skill in the art that the terms slowness and velocity are often used interchangeably. They will likewise be used interchangeably herein with the understanding that they are inversely related to one another and that the measurement of either may be converted to the other by simple and known mathematical calculations.

As mentioned above, acoustic logging tool 42 collects waveforms via the array 50 of longitudinally spaced receivers 52. The received waveforms are typically coherence processed to obtain formation compressional and shear wave slownesses. As is well known to those of ordinary skill in the art, in slow formations refractive effects inhibit transmission of shear wave energy from the formation back into the borehole, making shear wave slowness measurements in slow formations problematic. Hence, techniques for determining shear wave slowness in slow formations through measurements of borehole guided waves are used. Such techniques to determine shear wave slownesses from borehole guided wave slownesses are well known in the art. Generally, in these techniques corrections are applied to the measured guided wave slownesses, the corrections based on, for example, measured mud properties and measured borehole and formation properties. These corrections are often termed dispersion corrections.

In boreholes of large diameter, the signal to noise ratio (SNR) is generally poorer, not only in fast formations for compressional and shear waves, but also in slow formations for borehole guided waves. Moreover, in all drilling environments, acoustic measurement signals are contaminated by tool mode noise, drilling noise, and noise generated by flow of drilling mud. Other sources of noise can include interference of nearby downhole tools, noises from non-steady tool positions or varying mud properties, and local variations in near borehole rock properties. The generally lower signal to noise ratio in these circumstances affects the accuracy of computed compressional, shear, and guided wave slownesses. Embodiments of the present invention are intended to improve the signal to noise ratio (by reducing the noise) and thereby improve accuracy of downhole acoustic slowness measurements.

Waveform averaging (sometimes referred to in the art as waveform stacking) is known to sometimes reduce the aforementioned noise (e.g., when downhole conditions are unchanging during collection of the waveforms at given receiver). In such instances, the sought after signal(s) tend to add coherently while noise and background contamination often add incoherently. The result can be an improved signal to noise ratio. More typically, though, the downhole conditions change between the collection of one waveform and the collection of other waveforms by the same receiver. As a result of these changing conditions, the sought after signal may no longer add coherently so that the waveform averaging provides little if any improvement in signal to noise ratio.

One aspect of the present invention is the insight that stacking (averaging) of received waveforms can be improved by grouping the waveforms according to measured downhole conditions (measured borehole conditions), for example, the standoff distance and/or toolface angle at the time the waveform is transmitted or received. By grouping the collected waveforms according to particular criteria the sought-after signals in the grouped waveforms tend to have similar (or even substantially the same) arrival times. As a result, the sought after signal(s) tend to add coherently leading to an improved signal to noise ratio.

Figure 3:
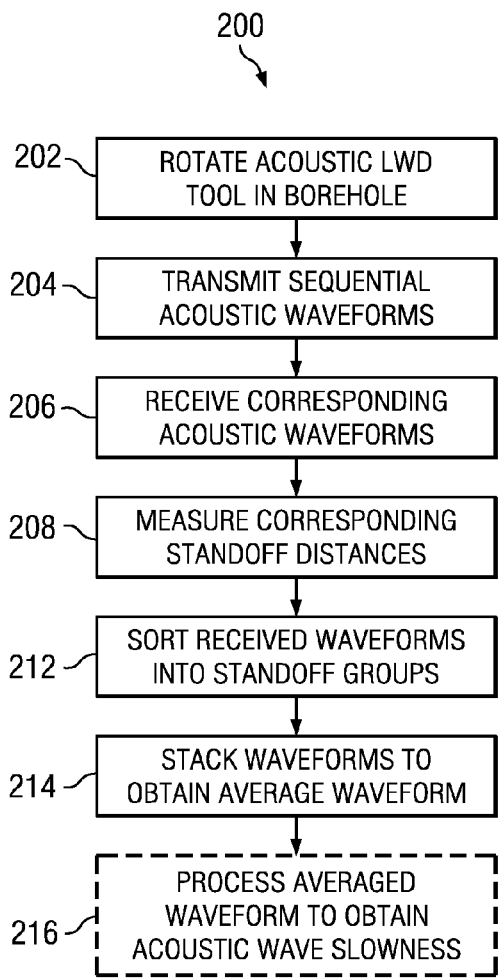
FIG. 3 depicts a flowchart of one exemplary method embodiment in accordance with the present invention.

FIG. 3 depicts a flow chart of one exemplary method embodiment 200 in accordance with the present invention. Method 200 includes deploying an acoustic logging while drilling tool (e.g., tool 42) in a subterranean borehole at 202. Multiple sequential pulses of acoustic energy are transmitted into the subterranean formation at 204 (e.g., using transmitter 44). Corresponding waveforms are then received using a linear array of acoustic receivers at 206 (e.g., receivers 52 in array 50). At 208 standoff distances are measured corresponding, for example, to the transmitting in 202 or the receiving in 204. The received waveforms may be correlated with the standoff measurements such that each waveform is assigned a standoff distance. The standoff distances preferably further correspond to the standoff distance between the transmitter and the borehole wall or between the array of receivers and the borehole wall.

At 212 the waveforms received in 206 are sorted into a plurality of groups based upon the standoff measurements made in 208. Each group is representative of a predetermined range of standoff values (or a range of standoff distances determined using predetermined criteria). Waveforms in each group are then stacked at 214 to obtain an average waveform. These averaged waveforms may then be optionally further processed at 216, for example, using a semblance algorithm to obtain a formation slowness such as a compressional wave slowness, a shear wave slowness, or a guided wave slowness.

It will be understood that the invention is not limited to any particular number of standoff groups or to any particular standoff ranges. In one exemplary embodiment of the invention, three standoff groups are utilized. The first group may have a standoff range up to about 0.5 inches. The second group may have a standoff range from about 0.5 to about 1.0 inches. And the third group may have a standoff range greater than about one inch. In a typical application, each of the groups has a standoff range from about one quarter of an inch to about 1 inch. However, the invention is in no way limited in these regards.

Figure 4:
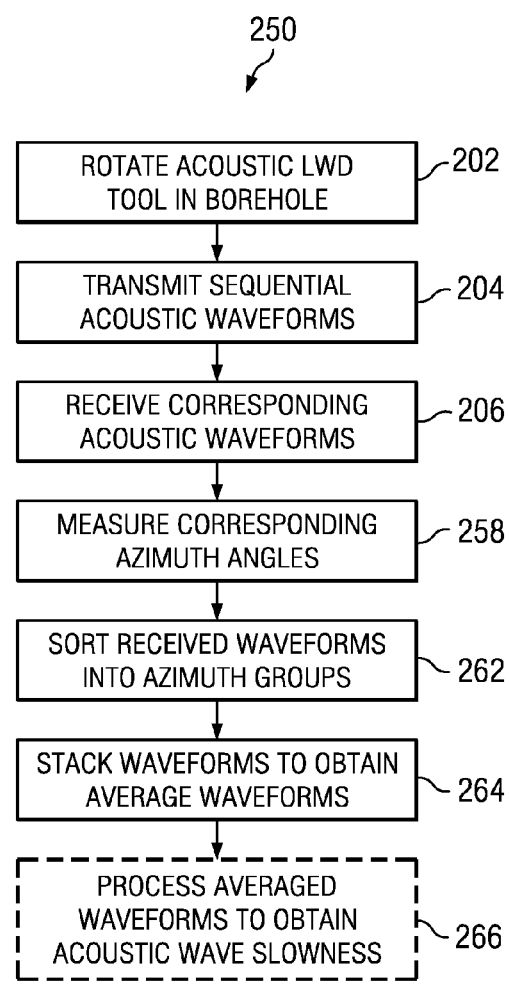
FIG. 4 depicts a flowchart of another exemplary method embodiment in accordance with the present invention.

FIG. 4 depicts a flow chart of another exemplary method embodiment 250 in accordance with the present invention. Method 250 is similar to method 200 in FIG. 3 in that it includes deploying an acoustic logging while drilling tool in a subterranean borehole at 202, transmitting a plurality of sequential acoustic pulses into the subterranean formation at 204, and receiving corresponding waveforms at 206. Azimuth angles are measured at 258 corresponding, for example, to the transmitting in 202 or the receiving in 204. The received waveforms may be correlated with the azimuth measurements such that each waveform is assigned an azimuth angle.

At 262 the waveforms received in 206 are sorted into a plurality of groups (azimuthal sectors) based upon the azimuth measurements made in 258. Each group is representative of a predetermined range of azimuth angles (or a range of azimuth angles determined using predetermined criteria). Waveforms in each group are then stacked at 264 to obtain an average waveform. These averaged waveforms may then be optionally further processed at 266, for example, using a semblance algorithm to obtain a formation slowness such as a compressional wave slowness, a shear wave slowness, or a guided wave slowness.

It will be understood that the invention is not limited to any particular number of azimuthal groups (also referred to as sectors or bins) or to any particular range of azimuth angles. In one exemplary embodiment of the invention, eight azimuthal groups are groups are utilized. In preferred embodiments, the azimuthal groups are equiangular (i.e., the same size). For example, eight 45 degree azimuthal sectors may be utilized. In a typical application each of the groups has an azimuth angle range from about 30 to about 90 degrees. However, the invention is in no way limited in these regards.

In methods 200 and 250 it is generally preferable to transmit a large number of acoustic pulses in 204 (e.g., 10 or more) and receive the corresponding waveforms in 206. In general, increasing the number of waveforms tends to correspondingly improve the signal to noise ratio.

With continued reference to FIGS. 3 and 4, it will be understood that methods 200 and 250 may be practiced using substantially any suitable acoustic LWD tools. For example, a conventional unipole tool such as that depicted on FIG. 2 may be utilized. Monopole, dipole, bipole, or quadrupole tool configurations may alternatively be utilized. The invention is not limited in this regard.

It will further be understood that each receiver in the receiver array generally receives a distinct waveform at 206. These waveforms may then be sorted according to standoff and/or azimuth measurements at 212 and 262. For example, the waveforms received at a first receiver in the array may be sorted into a first set of standoff and/or azimuth groups, the waveforms received at the second receiver may be sorted into a second set of standoff and/or azimuth groups, and so on. In certain embodiments of the invention it may be advantageous to sort the waveforms by both standoff distance and azimuth angle. Waveforms having common ranges of standoff distance and azimuth angle may then be stacked (averaged) as described above.

It will be still further understood that the stacking (averaging) in steps 214 and 264 is not limited to common arithmetic averaging. In certain embodiments of the invention it may be advantageous to compute a weighted average. For example, in one exemplary embodiment of the invention the waveforms may be weighted based upon the total acoustic energy in the received waveforms. Waveforms having more energy may be given greater weight than those having less energy. In another exemplary embodiment, the waveforms may be weighted based upon the eccentricity borehole. Waveforms received in a highly eccentric borehole may be given lower weight than those received in a less eccentric borehole. In still another embodiment of the invention, the waveforms may be weighted based upon the measured azimuth angle. The waveforms received nearest to the center of the sector may be given greater weight than those received nearer to the sector edge.

It will also be understood that certain of the waveforms may be time-shifted prior to stacking in 214 or 264 (i.e., a time shift may be applied to the waveform). For example, the standoff distances measured in 208 may be used to compute the time shifts. Distinct time shifts may be computed for each component of the waveform, i.e., a first time shift for the compressional wave, a second time shift for the shear wave, a third time shift for the borehole guided wave, and so on. The intent of the time shifts is to provide better correlation between the various components in the stacked waveforms. The time shifts may be proportional, for example, to the measured standoff distance and a measured or assumed velocity of the acoustic wave in drilling fluid.

With still further reference to FIGS. 3 and 4, the waveforms are typically digitally processed with each waveform being represented as a set of time-sampled amplitude values. The sampling rate is chosen based on the highest frequency of interest. The amplitude values are digitized with, for example, 8-bit or 12-bit precision, but other levels of precision can be used. Digital signal processing (DSP) methods may be employed to apply shifts, usually representative of time shifts, to different waveforms of the set. It will be understood that this description of stacking does not preclude applying other additional forms of waveform manipulation, for example, rescaling of waveform amplitudes, or processing to correct or reduce distortion from known causes. The invention is not limited in these regards.

Although not shown in FIG. 2, it will be appreciated that downhole tools deployed in accordance with method embodiments of this invention typically include an electronic controller. Such a controller typically includes conventional electrical drive voltage electronics (e.g., a high voltage power supply) for applying waveforms to the at least one transmitter to cause the transmitter to transmit an acoustic waveform. The controller typically also includes receiving electronics, such as a variable gain amplifier for amplifying the relatively weak return signal (as compared to the transmitted signal). That is, the controller is configured to cause the array of acoustic receivers to receive corresponding acoustic waveforms induced in the formation by the transmitted acoustic waveform. The receiving electronics may also include various filters (e.g., pass band filters), rectifiers, multiplexers, and other circuit components for processing the return signal. It will be appreciated that the controller may be disposed in the tool body, or may be located remotely from the tool body (e.g., elsewhere in the drill string). The invention is not limited in this regard.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc.

The controller may be disposed, for example, to execute method steps as described above with respect to FIGS. 3 and 4. For example, the controller may be configured to cause a transmitter to transmit an acoustic waveform into a subterranean formation, to record the tool face angle when the transmitter is fired, and to cause a linear array of receivers to receive corresponding acoustic waveforms. The controller may be further configured to measure a standoff distance and/or and azimuth angle corresponding to at least one of the transmitting or the receiving, and to sort the received waveforms into a plurality of groups, based on the measured standoff distances. The controller may be still further configured to process received waveforms so as to obtain acoustic wave slownesses. The invention is not limited in any of these regards.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect borehole azimuth and inclination as well as the tool face of the receivers. The controller may also optionally communicate with other instruments in the drill string, such as telemetry systems that communicate with the surface. The controller may further optionally include volatile or non-volatile memory or a data storage device.

Although the present invention and its advantages have been described in detail, it should be understood that various changes, substitutions and alternations can be made herein without departing from the spirit and scope of the invention as defined by the appended claims.

We claim:

1. A method for making acoustic logging while drilling measurements in a subterranean formation, the method comprising:
   (a) rotating an acoustic logging while drilling tool in a borehole, the borehole having a borehole wall, the tool including at least one acoustic transmitter configured to transmit an acoustic pulse into the borehole, at least one linear array of longitudinally spaced acoustic receivers, and at least one sensor configured to measure a borehole condition, wherein the borehole condition comprises an azimuth angle;
   (b) causing the transmitter to transmit a plurality of sequential pulses of acoustic energy into the subterranean formation;
   (c) causing the receivers to receive corresponding acoustic waveforms;
   (d) causing the sensor to measure borehole conditions corresponding to at least one of said transmitting in (b) or said receiving in (c);
   (e) sorting the waveforms received in (c) into a plurality of groups, each group representative of a range of values of the borehole condition; and
   (f) stacking the waveforms from at least one of the groups to acquire average waveforms;
   wherein a time shift is applied to at least one of the waveforms prior to stacking in (f), the time shift based on the borehole conditions measured in (d).

2. The method of claim 1, further comprising:
   (g) computing an acoustic wave slowness using a semblance algorithm and the average waveforms acquired in (f).

3. The method of claim 1, wherein said transmitted acoustic waveforms propagate as at least one of a compressional wave, a fast shear wave, or a guided wave.

4. The method of claim 1, wherein the borehole condition additionally comprises a standoff distance.

5. The method of claim 1, wherein said stacking in (f) comprises computing a weighted average of the waveforms in at least one of the groups.

6. A method for making acoustic logging while drilling measurements in a subterranean formation, the method comprising:
   (a) rotating an acoustic logging while drilling tool in a borehole, the borehole having a borehole wall, the tool including at least one acoustic transmitter configured to transmit an acoustic pulse into the borehole, at least one linear array of longitudinally spaced acoustic receivers, and at least one standoff sensor configured to measure a standoff distance between the borehole wall, at least one azimuth sensor configured to measure an azimuth angle, and at least one of the transmitter and the linear array;

(b) causing the transmitter to transmit a plurality of sequential pulses of acoustic energy into the subterranean formation;

(c) causing the receivers to receive corresponding acoustic waveforms;

(d) causing the standoff sensor to measure standoff distances and causing the azimuth sensor to measure azimuth angles corresponding to at least one of said transmitting in (b) or said receiving in (c);

(e) sorting the waveforms received in (c) into a plurality of groups, each group representative of a range of standoff distances, the sorting based on the standoff distances and azimuth angles measured in (d); and (f) stacking the waveforms in at least one of the groups to acquire average waveforms;

wherein a time shift is applied to at least one of the waveforms prior to stacking in (f), the time shift based on the standoff distance measured in (d).

7. The method of claim 6, further comprising:
(g) computing an acoustic wave slowness using a semblance algorithm and the average waveforms acquired in (f).

8. The method of claim 6, wherein said transmitted acoustic waveforms propagate as at least one of a compressional wave, a fast shear wave, or a guided wave.

9. A method for making acoustic logging while drilling measurements in a subterranean formation, the method comprising:

(a) rotating an acoustic logging while drilling tool in a borehole, the borehole having a borehole wall, the tool including at least one acoustic transmitter configured to transmit an acoustic pulse into the borehole, at least one linear array of longitudinally spaced acoustic receivers, and at least one standoff sensor configured to measure a standoff distance between the borehole wall and at least one of the transmitter and the linear array;

(b) causing the transmitter to transmit a plurality of sequential pulses of acoustic energy into the subterranean formation;

(c) causing the receivers to receive corresponding acoustic waveforms;

(d) causing the standoff sensor to measure standoff distances corresponding to at least one of said transmitting in (b) or said receiving in (c);

(e) sorting the waveforms received in (c) into a plurality of groups, each group representative of a range of standoff distances, the sorting based on the standoff distances measured in (d) and wherein each of the groups has a standoff range from about one quarter of an inch to about 1 inch; and (f) stacking the waveforms in at least one of the groups to acquire average waveforms.

10. The method of claim 6, wherein said stacking in (f) comprises computing a weighted average of the waveforms in at least one of the groups.

11. A method for making acoustic logging while drilling measurements in a subterranean formation, the method comprising:

(a) rotating an acoustic logging while drilling tool in a borehole, the borehole having a borehole wall, the tool including at least one acoustic transmitter configured to transmit an acoustic pulse into the borehole, at least one linear array of longitudinally spaced acoustic receivers, and at least one azimuth sensor configured to measure an azimuth angle of at least one of the transmitter and the linear array;

(b) causing the transmitter to transmit a plurality of sequential bursts of acoustic energy into the subterranean formation;

(c) causing the receivers to receive corresponding acoustic waveforms;

(d) causing the azimuth sensor to measure azimuth angles corresponding to at least one of said transmitting in (b) or said receiving in (c);

(e) sorting the waveforms received in (c) into a plurality of groups, each group representative of a range of azimuth angles, the sorting based on the azimuth angles measured in (d); and (f) stacking the waveforms in at least one of the groups to acquire average waveforms;

wherein a time shift is applied to at least one of the waveforms prior to stacking in (f), the time shift based on the azimuth angle measured in (d).

12. The method of claim 11, further comprising:
(g) computing an acoustic wave slowness using a semblance algorithm and the average waveforms acquired in (f).

13. The method of claim 11, wherein said transmitted acoustic waveforms propagate as at least one of a compressional wave, a fast shear wave, or a guided wave.

14. The method of claim 11, wherein each of the groups has an azimuth angle range from about 30 to about 90 degrees.

15. The method of claim 11, wherein said stacking in (f) comprises computing a weighted average of the waveforms in at least one of the groups.

* * * * *